United States Defensive Publication [19] (H) [11] T100,303

Dix [43] Feb. 3, 1981

[54] PRODUCTION OF CARBON FIBERS BY THE DIRECT CARBONIZATION OF POLYBENZIMIDAZOLE FIBER

[76] Inventor: Robert Dix, 5 McKernan Ct., Wayne, Passaic, N.J. 07055

[21] Appl. No.: 109,582

[22] Filed: Jan. 4, 1980

[51] Int. Cl.[3] ..... D01F 9/12

[52] U.S. Cl. ..... 423/447.4; 264/29.2; 423/447.5; 423/447.6

[57] ABSTRACT

An improved process is provided for readily transforming a relatively low denier (i.e. 0.5 to 10 denier per filament) polybenzimidazole fibrous material to a carbonaceous fibrous material which contains at least 90 percent carbon by weight. The polybenzimidazole fibrous material initially is reacted with a solution of an acid (as described) to form a polybenzimidazonium salt, and the fibrous material subsequently is heated in a non-oxidizing atmosphere to form the carbonaceous fibrous material which retains the original fibrous configuration intact. A preferred acid solution for use in the present process is a dilute solution of sulfuric acid. The resulting carbon fibers are useful as fibrous reinforcement in the resinous or metallic matrix material.

10 Claims, No Sheets Drawing.

23 Pages Specification

The file of this unexamined application may be inspected and copies thereof may be purchased (849 O.G. 1221, Apr. 9, 1968)